(12) United States Patent  
Otsubo

(10) Patent No.: US 10,867,400 B2  
(45) Date of Patent: Dec. 15, 2020

(54) SYSTEM FOR PROCESSING AN IMAGE OBTAINED BY USING STEREO PHOTOGRAPHY

(71) Applicant: MAXELL, LTD., Kyoto (JP)

(72) Inventor: Hiroyasu Otsubo, Kyoto (JP)

(73) Assignee: MAXELL, LTD., Kyoto (JP)

( * ) Notice: Subject to any disclaimer, the term of this patent is extended or adjusted under 35 U.S.C. 154(b) by 66 days.

(21) Appl. No.: 16/316,826

(22) PCT Filed: Aug. 16, 2017

(86) PCT No.: PCT/JP2017/029443  
§ 371 (c)(1),  
(2) Date: Jan. 10, 2019

(87) PCT Pub. No.: WO2018/034304  
PCT Pub. Date: Feb. 22, 2018

(65) Prior Publication Data  
US 2019/0318495 A1    Oct. 17, 2019

(30) Foreign Application Priority Data  
Aug. 18, 2016  (JP) ................................. 2016-160508

(51) Int. Cl.  
*G06T 7/593* (2017.01)

(52) U.S. Cl.  
CPC .... *G06T 7/593* (2017.01); *G06T 2207/10012* (2013.01); *G06T 2207/20228* (2013.01)

(58) Field of Classification Search  
CPC . G06T 2207/10012; G06T 2207/20228; G06T 7/593; H04N 13/139; H04N 13/239; H04N 2013/0081; H04N 2013/0092  
See application file for complete search history.

(56) References Cited

U.S. PATENT DOCUMENTS

2018/0150949 A1* 5/2018 Matono ..................... G06T 5/50

FOREIGN PATENT DOCUMENTS

EP    2 693 393 A1    2/2014  
JP    2001-145090 A    5/2001  
(Continued)

OTHER PUBLICATIONS

International Search Report dated Oct. 31, 2017 for the PCT International Application No. PCT/JP2017/029443.

*Primary Examiner* — Nirav G Patel  
(74) *Attorney, Agent, or Firm* — Volpe Koenig

(57) ABSTRACT

An image processing system for reducing a calculation amount when calculating a parallax using an image of stereo photography. Reduced image data is generated by reducing image data respectively photographed by a plurality of cameras for stereo photographing, followed by reducing the number of pixels of image data. The image data and the reduced image data are stored in a memory. A plurality of reduced image data having the same photographing period are compared with each other to find a parallax. A parallax calculation region is set which includes the same position as a region where a parallax has been detected on reduced image data among a plurality of image data having the same photographing period. A parallax is calculated in the parallax calculation region of the image data formed before image reduction, and such parallax is used as a parallax of the image data formed before image reduction.

9 Claims, 4 Drawing Sheets

(56) References Cited

FOREIGN PATENT DOCUMENTS

| | | |
|---|---|---|
| JP | 2001-319229 A | 11/2001 |
| JP | 2005-258954 A | 9/2005 |
| JP | 2011-164905 A | 8/2011 |
| WO | 2012/132168 A1 | 10/2012 |

* cited by examiner

SYSTEM FOR PROCESSING AN IMAGE OBTAINED BY USING STEREO PHOTOGRAPHY

TECHNICAL FIELD

The present invention relates to an Image processing system for processing an image obtained by using stereo photography.

BACKGROUND ART

Generally, monitoring is performed which employs photography using a camera. Such a monitoring, for example, includes not only crime prevention, identification of criminal, but also monitoring in front of a travelling vehicle. That is, a camera for monitoring includes not only a so-called surveillance camera, but also an in-vehicle camera for automatic driving. In addition, there are cases where a stereo camera system combining two cameras is used for such monitoring purpose (see, for example, Patent Document 1). In a stereo camera system, for example, a parallax is calculated which represents a difference in positions on images of the same object taken on the image data of a pair of left/right cameras. By calculating a parallax, it is possible to determine a distance from an object to be photographed, the size of the object, a three-dimensional shape of the object and the like, all based on the parallax. This makes it possible to monitor a target smoothly and accurately based on the three-dimensional shape of the object and a distance from the object. Moreover, even in human face recognition, it is possible to improve the authentication accuracy since the three-dimensional shape is known, and it can be effectively used in searching for a wanted criminal, in various kinds of authentications using various kinds of monitoring cameras. In addition, it can also be effectively used in forward monitoring and the like for an automatic vehicle driving.

CITATION LIST

Patent Document

Patent Document 1: Japanese Patent Application Laid-Open No. 2001-145090

SUMMARY OF THE INVENTION

Technical Problems

On the other hand, in a digital camera for use as a photographing device, there have been an increase in the number of pixels of an image sensor (an improvement in resolution), and an improvement in a frame rate at the time of photographing a moving image, and the like. Even in a camera for monitoring purpose, to improve a recognition rate of a monitored object, and to improve the accuracy of distance measurement, an improved camera has been put into use which is capable of photographing at a high resolution and at a high frame rate.

In this case, since the number of pixels of the image subjected to the parallax calculation increases, calculation amount in the parallax calculation increases and frame rate also increases, resulting in a fact that a time used for the parallax calculation per image (frame) has to be shorten. Consequently, a high-speed and expensive arithmetic processing circuit is required to be used as an image processing circuit for parallax calculation. In other words, if a high-resolution stereo camera is used to improve a recognition rate of a monitored object and to improve an accuracy of a distance measurement, not only a cost for the camera but also a cost for electronic components such as an arithmetic processing circuit for parallax calculation will increase. Besides, although a high-resolution camera can be used to suppress an increase in cost, it is difficult to perform a process at a high frame rate if using low speed electronic components.

The present invention has been accomplished in view of the above-discussed circumstances, and it is an object of the present invention to provide an image processing system which, when using stereo photograph image to perform parallax calculation, can reduce an amount of calculation in parallax calculation so as to speed up the parallax calculation.

Solution to the Problems

In order to solve the above-discussed problems, an image processing system according to the present invention comprises:

image reducing unit for generating a plurality of reduced image data obtained by reducing a plurality of image data, the plurality of image data being obtained by photographing the same photographing range at the same photographing time using a plurality of cameras arranged at different positions for stereo photographing;

first parallax calculation unit for calculating a parallax using the plurality of reduced image data;

parallax calculation region determining unit for determining a parallax calculation region for calculating a parallax on image data formed prior to reducing the image data, based on the parallax calculated from the reduced image data by the first parallax calculation unit; and parallax calculation unit that calculates a parallax in the parallax calculation region on the plurality of image data formed before image reduction, and uses the calculated parallax as the parallax of the image data formed before image reduction.

According to the above-described configuration, as compared with a case where the parallax is directly calculated from the image data having a large number of pixels, it is possible to reduce a calculation amount by narrowing down a parallax calculation region which performs a parallax calculation on image data formed before image reduction, by using reduced image data which has been reduced and has a reduced number of pixels. This makes it possible to shorten the processing time when using the same arithmetic processing unit as in the case of directly obtaining a parallax from unreduced image data. Therefore, when processing moving image data, it is possible to increase the frame rate of a processable moving image.

That is, when parallax is calculated by using reduced image data having a small number of pixels, since the number of pixels is small, it is possible to quickly obtain parallax with a small calculation amount. However, since the reduced image data whose resolution has degraded is used, a required accuracy of the parallax will become low. In view of this, after obtaining a parallax by using the reduced image, a region including pixels having parallax in the reduced image data is obtained on non-reduced image data, and a region on the image data formed before image reduction which is the same position as the above-described region, will be used as a parallax calculation region. The parallax is calculated only in this parallax calculation region. At this time, even if the number of pixels of the image data is large, since the parallax is calculated only in the parallax calculation region in the image, it is possible to suppress a calculation amount. As a result, since the parallax is calculated using a high-resolution image in the parallax calculation region, it is possible to obtain a parallax with a high accuracy in a state where the calculation amount is suppressed.

Therefore, in a real time monitoring, it is possible to calculate a parallax in a shortened time by using a high-resolution stereo image without using an expensive arithmetic processing device.

The image processing system of the present invention, further includes background data output unit which outputs, as background parallax data, a parallax of a portion involving no parallax change during a predetermined period, based on the reduced image data formed by reducing the image data photographed by the cameras during a predetermined period before the photographing time, wherein the parallax calculation region determining unit compares the parallax calculated from the reduced image data by the first parallax calculation unit with the parallax of the background parallax data outputted from the background data output unit, and uses an unmatched portion as the parallax calculation region.

According to such a configuration, a comparison is performed between background parallax data and the parallax of reduced image data formed by reducing image data for obtaining a parallax. Here, the background parallax data is parallax data which has not changed during a predetermined period on reduced image data formed through image data reduction over a predetermined period during which the same photographing range earlier than a time for photographing image data before reduction has been photographed. After the comparison, regions in which parallaxes are not coincident with each other are applied to the image data and used as parallax detection regions. In this way, when parallax is calculated from the reduced image, it is possible to allocate a portion having a parallax different from a parallax forming a background to image data for calculating a parallax and use the same as parallax calculation region. At this time, since only a portion having the same parallax as the parallax forming background is removed and parallax calculation region is determined, it is possible to more precisely determine a region where there is no difference from the parallax of the background image, and it is also possible to remove portions not moving, and to increase the accuracy of a parallax finally calculated by using the image data.

In the image processing system, for example, when parallax is calculated as described above based on moving image of monitoring camera of a stereo system, a parallax has already been obtained by using the reduced image data obtained by reducing the image data earlier than the image data of current time, by continuously calculating a parallax with respect to a moving image. As a result, it is possible to obtain background parallax data using the parallax data which has already been obtained. Therefore, it is possible to suppress a calculation amount increase which is otherwise caused due to calculation of background parallax data.

Further, according the above-described configuration of the present invention, the image reducing unit generates a plurality of reduced image data in which the number of pixels are stepwise different for each image data;

the first parallax calculation unit calculates a parallax using a plurality of minimal reduced image data having the smallest number of pixels among the reduced image data;

the parallax calculation region determining unit determines, based on the parallax to be calculated by using the reduced image data having one stage less pixels, the parallax calculation region on the reduced image data having the number of pixels one stage more than the above reduced image data or the image data formed before the image reduction;

the parallax calculation unit calculates a parallax of the parallax calculation region of the reduced image data for which the parallax calculation region has been determined or the image data formed before the image reduction.

According to this configuration, the parallax calculation region is determined step by step based on the parallax obtained on the reduced image having a smaller number of pixels, with respect to the image having a larger number of pixels. At this time, for example, even if parallax is found on image data having a small number of pixels, although the state of the parallax of the details is not known, if the parallax of parallax detection region is detected by using image data having a larger number of pixels, the parallax of the details will become known. For example, when judging the face of a person using parallax of the details, it is possible to make clear the shapes of detailed portions of a human face, such as the shape of a person's nose hole, wrinkles of the outer corners of the person's eyes, and the like.

Further, in the above configuration of the present invention, it is preferable to include the cameras that output the captured image data.

According to such a configuration, it is possible to handle the image processing system as a monitoring imaging device having a stereo camera, thus ensuring an easy handling as compared with a situation where the stereo camera and the image processing system are separated apart from each other.

Effects of the Invention

Using the present invention, it is possible to reduce a calculation amount when finding a parallax from a stereo image, thereby ensuring a reduced cost and a shortened time for image processing.

DESCRIPTION OF EMBODIMENTS

Embodiments of the present invention will be described below.

Figure 1:
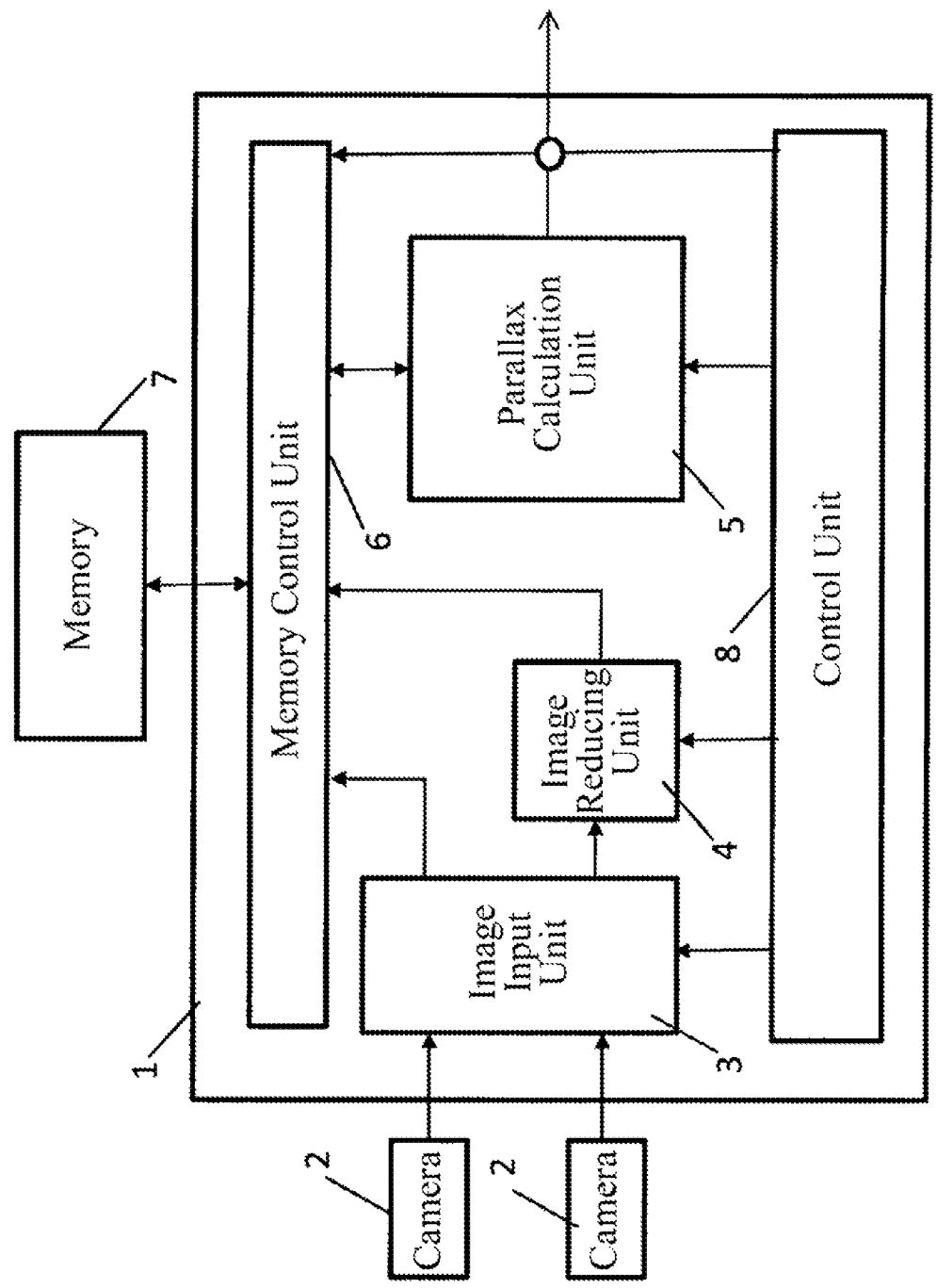
FIG. 1 is a block diagram showing a configuration of an image processing system according to an embodiment of the present invention.
Figure 2:
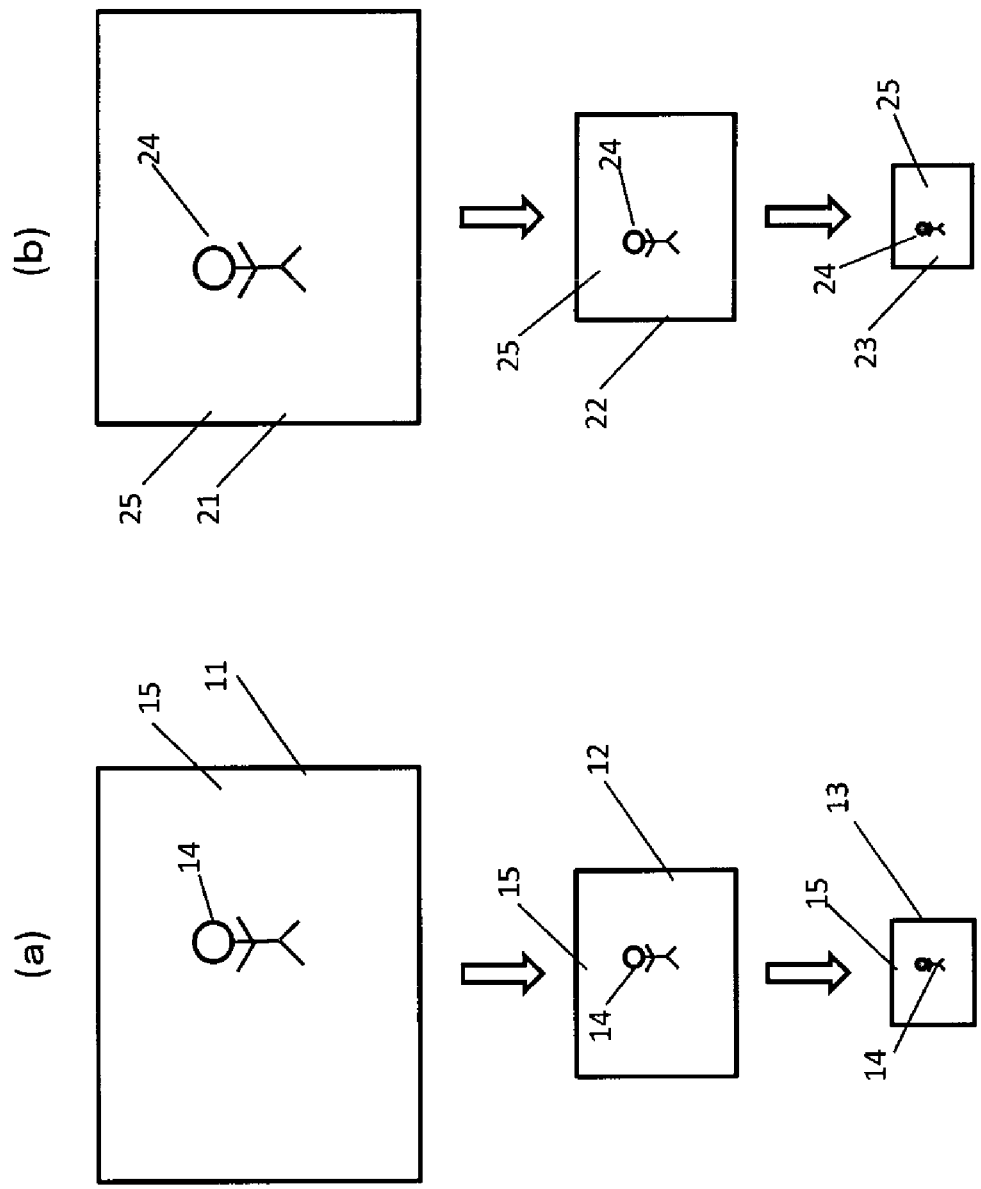
FIG. 2 is a view for explaining a reduction of a stereo image, in which (a) shows a left image and (b) shows a right image.

An image processing system 1 of this embodiment shown in FIG. 1 is, for example, a monitoring camera system including a photographing device (camera 2) capable of stereo photographing, also capable of parallax detection. The image processing system 1 according to this embodiment is provided with a pair of right and left cameras 2, 2, the same monitoring range is photographed by the two cameras 2, 2 that are separated from each other on the left and right, obtaining left image data 11 and right image data 21, as shown in FIG. 2. On the other hand, it should be noted that the image processing system 1 may or may not include the camera 2. In any case, a photographed stereo image is processed by the image processing system 1.

The two cameras 2, 2 are fixed on the left and right by a predetermined distance and are operated to take pictures in the same monitoring range. In addition, in this embodiment, the cameras 2, 2 are not in-vehicle cameras, but are fixed to a building (structure) on the ground, and are used as so-called surveillance cameras. Moreover, the cameras 2, 2 are also operated to photograph a moving object to produce moving images at a preset frame rate.

The image processing system 1 includes: an image input unit 3 which receives, as stereo images fed from the two cameras 2, 2 the left image data 11 and the right image data 21 shown in FIG. 2; an image reducing unit (image reducing unit) 4 which reduces the sizes of the left image data 21 and right image data 21 inputted thereto; a memory 7 for storing image data inputted into the image input unit 3 and reduced image data processed by the image reducing unit 4; a memory control unit 6 for controlling the memory 7 and for controlling data (such as image data) input to the memory 7 and data (such as image data) output from the memory 7; a parallax calculation unit (a first parallax calculation unit, parallax calculation unit) 5 for calculating a parallax from the simultaneously photographed left image data 11 and the right image data 21, as well as reduced image data 12, 13, 22, 23, all read out from memory 7 through the memory control unit 6; and a control unit 8 which controls the image input unit 3, the image reducing unit 4, the parallax calculation unit 5, and the memory control unit 6. The image reducing unit 4 and the parallax calculation unit 5 may be programmable general-purpose circuits or dedicated circuits.

The left and right image data 11, 21 outputted from the cameras 2, 2 are inputted into the image input unit 3. The image input unit 3 serves as an interface with the cameras 2, 2 and the captured left and right image data 11, 22 are inputted into the image input unit 3. The inputted image data 11, 21, by virtue of the memory control unit 6, are sequentially stored in the memory 7 whose data input/output is controlled by the memory control unit 6. The left and right image data 11, 21 from the image input unit 3 are outputted to the image reducing unit 4 and are reduced by the image reducing unit 4.

In the image reducing unit 4, the left and right image data 11, 21 are reduced stepwise (hierarchically). That is, left and right reduced image data 12, 13, 22, and 23 having different total pixel numbers due to different reduction rates are generated and stored in the memory 7 via the memory control unit 6. Regarding the reduced image data 12, 13, 22, and 23 and the image data 11, 21, on the left side, the number of pixels has been reduced in the order of the image data 11, the reduced image data 12, and the reduced image data 13, while on the right image side, the number of pixels has been reduced in order of the image data 21, the reduced image data 22, and the reduced image data 23.

The parallax calculation unit 5 reads out the left and right image data 11, 21 and the reduced image data 12, 13, 22, and 23 obtained by reducing the image data 11, 21 to the number of pixels at several stages, thereby performing a hierarchy parallax calculation, and finally obtaining a parallax based on the image data 11, 21 existing before the image reduction. In the image processing system 1, based on the obtained parallax, a distance from an object, a shape including the size of the object, and the like are to be found. On the other hand, it is also possible to recognize a human face and identify a person based on an authentication of the recognized face or a person's face.

In the image reducing unit 4, the photographed image data is reduced. At this time, reducing is carried out at the resolutions of several stages. For example, left and right reduced image data 12, 13, 22, and 23 with resolutions of two stages and having different numbers of pixels are produced. As a reducing method, for example, a decimation filter (low pass filter) can be used. Here, as shown in FIG. 2, the left and right reduced image data 12, 22 having a low reducing ratio, and reduced image data 13, 23 having a higher reducing ratio and a smaller number of pixels than those of the reduced image data 12, 22, can be obtained by processing the image data 11, 21 using a decimation filter. On the other hand, it is preferable that the reducing process be performed at a real time on the image data 11, 21 of each frame during a moving image photographing using the cameras 2, 2.

Figure 4:
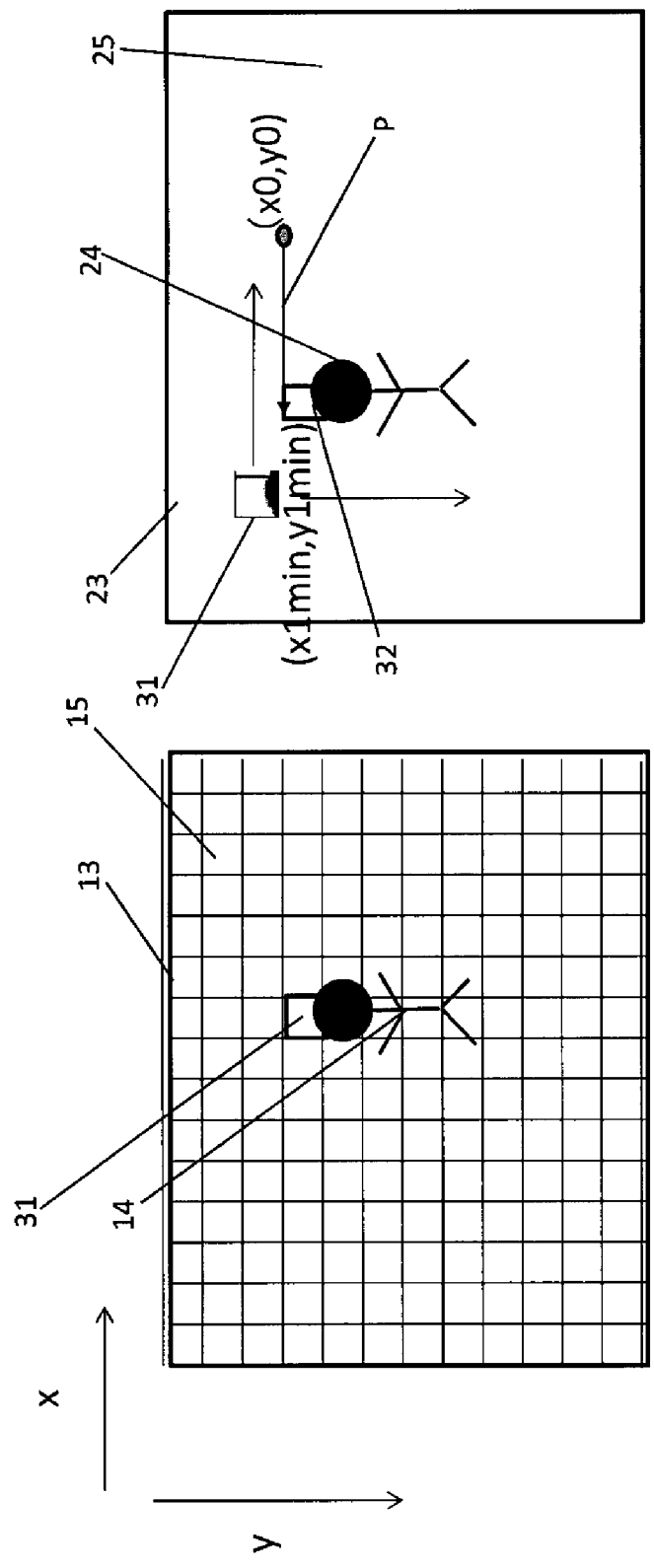
FIG. 4 is a diagram for explaining a parallax detection method.

In this embodiment, among the reduced image data 12, 13, 22, and 23 reduced at a plurality of reducing rates, the left and right minimal reduced image data 13, 23 which become the lowest layer in the hierarchy due to the highest reducing ratio and the smallest number of pixels, will be used to obtain a parallax, as shown in FIG. 4. In calculating the parallax, for example, the left reduced image data 13 is formed into blocks. That is, as shown in FIG. 4, the left reduced image data 13 is divided into blocks composed of a plurality of pixels. Next, each block of the left reduced image data 13 is scanned on the right reduced image data 23. However, the left reduced image data 13 and the right reduced image data 23 are reduced image data obtained by respectively reducing the left image data 11 and the right image data 21 in which the same imaging range is photographed by the left and right cameras 2, 2 at the same time. Thus, they are left and right images photographed at the same timing.

Scanning each block of the left reduced image data 13 on the right reduced image data 23 is to detect a block that is substantially the same image as each block of the left reduced image data 13 on the right reduced image data 23. In FIG. 4, what to be monitored is a person 14. Further, in FIG. 4, on the left reduced image data 13, a person 14 is moving relative to the background image 15.

At this time, on the right reduced image data 23, a person 24 corresponding to the person 14 of the left reduced image data 13 is shown, while the background image 25 is shown relative to the background image 15. Here, the background images 15, 25 are portions which have not changed (moved) for a predetermined time or longer. For example, unchanged portions such as a structure like a building or side surface of a tree trunk or a cliff forms a background image. In this background image, since both the left and right stereo images do not change, a parallax will not change when there is such a parallax. For example, when a moving object such as a person or an automobile is photographed on a background image in a state where there is nothing to be moved by wind, it is possible to detect a moving body if the parallax changes in part of the background image whose parallax is not changing, and it is also possible to automatically easily detect an intruder or the like from a change in parallax and from an image. That is, it is possible to automatically detect a moving object such as an intruder by taking a difference between the parallax of each pixel of the background image whose parallax does not change for a fixed time and the parallax of each pixel of the current image. With respect to a vicinity where this intruder is present, it is possible to perform a parallax detection of hierarchy and improve the accuracy.

In FIG. 4, regarding the left reduced image data 13 and the right reduced image data 23, the person 14 and the person 24 represent the same object and have a parallax. Here, as one of the block of the left reduced image data 13 divided into a plurality of blocks, a block 31 which is located at upper left of the head of the person 14 is scanned on the right reduced image data 23. At this time, the scanning refers to searching for the same image as the image of the block of one image of the stereo image on the other image. In the stereo image, depending on distances from the cameras 2,2, the object of the left image and the object of the right image are deviated from each other and thus a parallax occurs. Such a parallax can be calculated by searching for and specifying the object of one image using the other image and performing a comparison between the positions of these objects.

As shown in FIG. 4, when searching for the same image as the image of the block 31 of the left reduced image data 13 on the right reduced image data 23 and when finding an image 32 which is almost the same as the image of the block 31, on the right reduced image data 23, a difference between a position (x0, y0) corresponding to the block 31 and a position (x1min, y1min) of the image 32 is a parallax P. The parallax of the stereo image photographed by the left and right cameras 2, 2 is a distance between the block 31 and the image 32 along the left-right direction (Z-direction in FIG. 4).

On the other hand, it is not necessary to search for each block of the left reduced image data 13 in all regions of the right reduced image data 23, and it is necessary to search in only a region where parallax occurs. Although it is possible to scan the whole reduced image data 13, 23 of the lowermost hierarchy layer having the highest reducing ratio, since the parallax occurs in the left-right direction as described above, it is not necessary to scan portions where the right reduced image data deviates largely in the vertical direction with respect to the position of the block of the left reduced image data 13.

In the scanning, a method of searching for a region that becomes the same images as respective blocks of the left reduced image data 13, may be described as follows. Namely, the scanning is to make, as evaluation values, for example, the sum of the squares of differences among respective pixels corresponding to 8×8, 4×4 blocks, or the sum of the absolute values of the differences.

The sum of the squares of the differences among respective pixels can be expressed by the following equation.

$$\Delta = \Sigma(Yleft(x0+i,y0+j) - Yright(x1+i,y1+j))^2$$

The sum of the absolute values of the differences among the respective pixels can be expressed by the following equation.

$$\Delta = \Sigma \, ABS(Yleft(x0+i,y0+j) - Yright(x1+i,y1+j))$$

Note that (x0, y0) and (x1, y1) are the addresses of the upper left pixels of the above-mentioned blocks, representing the arrangement positions of the pixels in the X and Y directions. Also, (x0, y0) is the address of the pixels of the left image, and (x1, y1) is the address of the pixels of the right image. The value of each pixel of the addresses is, for example, a luminance.

A difference between a position of the right image where an evaluation value Δ is the smallest and a position corresponding to the block of the left image, i.e., (x0, y0)−(x1min, y1min) is a parallax. That is, for example, as shown in FIG. 4, a parallax is a distance between two coordinate positions, one being a coordinate position (x0, y0) of the block 31 on the left reduced image data 13 to be scanned on the XY coordinates of the right reduced image data 23, the other being a coordinate position where the evaluation value Δ is the smallest on the right reduced image data 23, i.e., a coordinate position (x1min, y1min) of the image 32 on the upper left of the head of the person 24.

Figure 3:
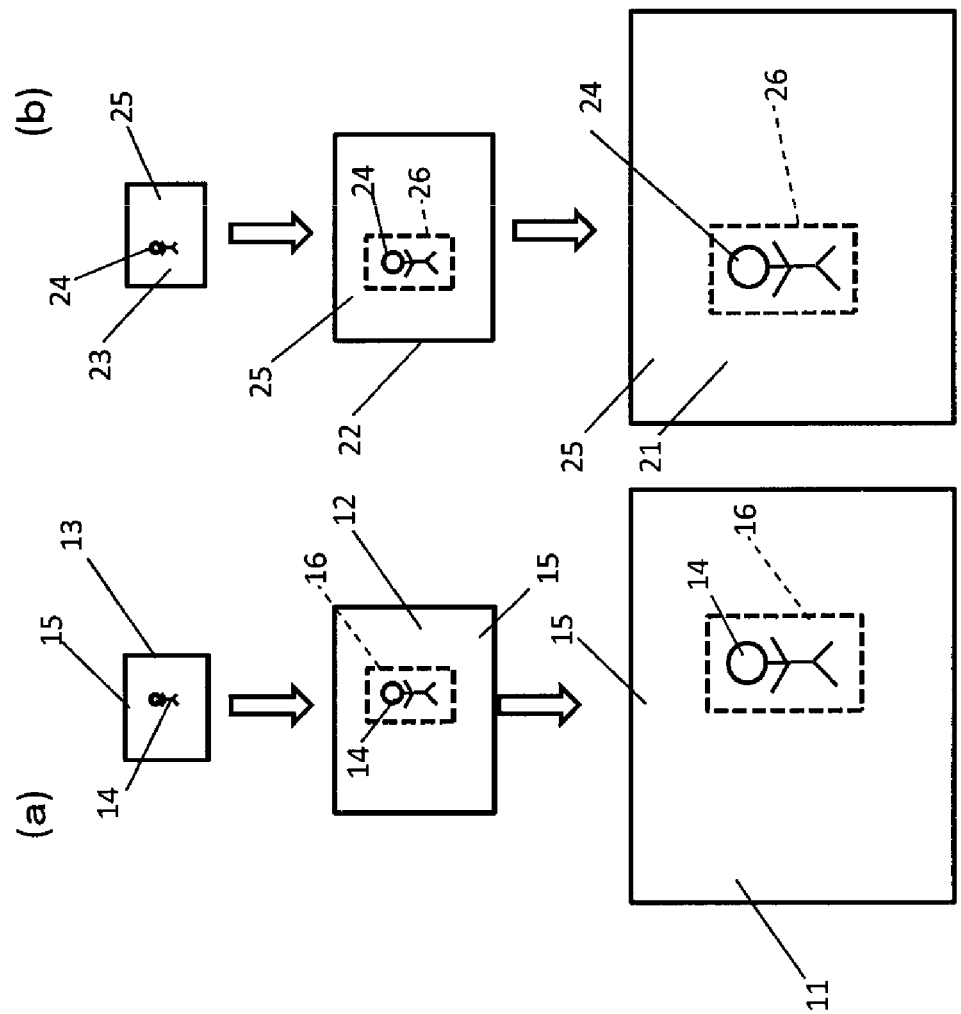
FIG. 3 is a diagram for explaining a hierarchy parallax calculation method of a stereo image, in which (a) shows a left image and (b) shows a right image.

Next, as shown in FIG. 3, after specifying a region having a parallax with respect to the background images 15, 25 by using the reduced image data 13, 23, a parallax is calculated again by using the left and right reduced image data 12, 22 having a reducing ratio lower than the reduced image data 13, 23 and a larger number of pixels. In this case, a block scanned on the right reduced image data 22 is a block of a parallax calculation region 16 set on the left reduced image data 12. The parallax calculation region 16 is set on the left reduced image data 12, such that on the left reduced image data 12 the parallax calculation region 16 has the same coordinate position as the region including a portion having the parallax on the left reduced image data 13 having a higher reducing ratio than the left reduced image data 12. Further, on the right reduced image data 22, a region in which the block of the left reduced image data 12 is scanned, is the parallax calculation region 26 of the right reduced image data 22. The parallax calculation region 26 is set on the right reduced image data 22, such that on the right reduced image data 22 the parallax calculation region 26 has the same coordinate position as the region including a portion having the parallax on the right reduced image data 23 having a higher reducing ratio than the right reduced image data 22. The details of the parallax calculation regions 16, 26 will be described later.

In this embodiment, as described above, the reduced image data 12, 13, 22, and 23 have reducing ratios of two stages, and if the image data 11, 21 before image reduction are also included, there will be hierarchies of three stages, forming a first hierarchy, a second hierarchy, and a third hierarchy beginning with a hierarchy having a small number of pixels.

During the hierarchy parallax calculation, parallax is calculated by using the image data 11, 21 which have not been reduced. At this time, in the same way a parallax is obtained by using the reduced image data 12, 22 having lower reducing ratios described above, the parallax calculation region 16 is set on the left image data 11 and the parallax calculation region 26 is set on the right image data. In this case, the parallax calculation regions 16, 26 are set on the image data 11, 21 which is the third hierarchy, based on the parallax obtained on the reduced image data 12, 22 which is the second hierarchy. The parallax calculation using the image data 11, 21 can be performed by scanning, in the parallax calculation region 26, the block included in the parallax calculation region 16, in the same way the parallax calculation is performed by using the reduced image data 12, 22 of the second hierarchy.

As a result, it is possible to clearly obtain a detailed parallax of an object to be monitored, based on the image data 11, 21 which have a large number of pixels and which have not been reduced. For example, when finding the shape of a human face or the like based on a parallax, it is possible to clearly define the shape of a human face in detail. At this time, if the parallax calculation is directly performed on an entire screen from the image data 11, 21 having large number of pixels, an amount of calculation becomes huge.

In this case, if the processing speed of the image processing apparatus is low, for example, when parallax is to be found in real time from a moving image, a frame rate that can be handled will decrease. On the other hand, if hierarchy parallax calculation is performed by using reduced image data having a decreased resolution, i.e., having reduced pixels resulting from image reducing using reducing ratios of several stages as described above, it is possible to reduce an amount of calculation in the parallax calculation on high resolution image data and perform the parallax calculation at high speed without using an expensive high speed large image processing apparatus.

Next, a hierarchy parallax calculation method will be described in more detail below. In the first hierarchy parallax calculation method, as described above, the image data 11, 21 are reduced using reducing ratios of several stages. Further, in the first hierarchy parallax calculation method, as the stage prior to the parallax calculation, on the reduced image data (minimal reduced image data) 13, 23 at the lowest hierarchy layer having the highest reducing ratio, the method is to obtain and store a parallax of reduced image data forming the background of a monitored object on which the parallax calculation is performed. The background in this case is, for example, reduced image data excluding portions which will move. At this time, even if there is a parallax, but if there is no change in parallax during a predetermined period, the portions will be background data. On the other hand, if there is a change in parallax during a predetermined period, the above portions will not be included in background data. In this case, if the image processing for obtaining the parallax is continuously performed for a long time, the parallax calculation will be sequentially performed on the left and right reduced image data 13, 23, thereby finding parallaxes through calculation.

Therefore, regarding a parallax data during a predetermined period prior to the present time, portions involving no changes in parallax are updated and stored as background data. In this way, when the image processing system 1 of this embodiment is used as a monitoring camera system and image data that is constantly photographed is being stored, and when parallaxes are to be found on the whole reduced image data 13, 23, a parallax difference will be found each time a parallax is found, a parallax of a portion having almost no parallax difference during a predetermined period (a predetermined number of images) is used as a parallax of background. The parallax data which is the background of such reduced image data 13, 23 is constantly updated and stored. On the other hand, it is not necessary to constantly update and store the parallax data forming the background. For example, the updating and storing may also be performed in each predetermined period, thereby storing, as background parallax, the parallax of portions having no parallax change during a predetermined period. The parallax forming background is stored, for example, in a state in which parallax is allocated to each of the above-described blocks or pixels. Further, in the parallax data forming the background, a portion having a large parallax but involving no displacement will become background, while portions involving displacement will be removed from the background even if a parallax is small.

Next, for the whole left and right reduced image data 13, 23 of the lowermost hierarchy layer, a normal parallax calculation is performed as described above. A difference between the detected parallax of the lowermost layer and a lowermost layer parallax registered as the background is taken to determine a changed region. With respect to this region, a parallax calculation is performed for the next hierarchy layer (the second hierarchy layer whose reducing ratio is one stage lower). A range of reduced image data 12, 22 of the second hierarchy layer corresponding to the coordinate position of the above-described region on the reduced image data 13, 23 of the lowermost layer will become the above-described parallax calculation regions 16, 26.

With respect to the second hierarchy layer, it is possible to newly set detection point (pixel) at a pixel accuracy of the second hierarchy layer, i.e., to increase the number of pixels through interpolation or the like. As described above, since a parallax of a portion forming a background is found with respect to the reduced image data 13, 23 of the lowermost layer, it is possible to find a region involving a difference between the parallax of each pixel forming the background and a parallax to be found this time, to allocate this region to the reduced image data 12, 22 of the second hierarchy layer, thereby detecting a parallax in a parallax calculation region allocated to the reduced image data 12, 22 of the second hierarchy layer.

In the reduced image data 12, 22 of the second hierarchy layer, a pixel (block) having a parallax is determined. Then, a region including this parallax-containing portion is determined. Here, a portion including +2 pixels and −2 pixels in the X direction and the Y direction of a pixel having a parallax is included in this region. In an XY image based on the number of pixels, if X is 5 and Y is 5 for a point having a parallax, there will be a region in which, for example, X is 3 to 7 and Y is 3 to 7.

In addition, when points having parallaxes gather up to form a region, it is possible to determine a region having +2 pixels and −2 pixels in the X direction and Y direction with respect to this region.

This region is allocated to the image data 11, 21 of the first hierarchy layer having a low reducing ratio, i.e., the uppermost hierarchy layer which has not been reduced. At this time, in the image data 11, 21, the number of pixels may be increased through interpolation. For example, the pixel interval may be set at 0.5 times or 0.25 times the former interval. That is, the number of pixels in the X direction and the Y direction may be doubled or quadrupled. The parallax data is refined by recalculating the parallax using the image data 11, 21 of the uppermost layer or the high resolution image data formed by interpolating the image data 11, 21, and the shape of the monitored object is reproduced in detail, based on the parallax as described above.

On the other hand, it is preferable that the above-mentioned region is, on the reduced image data 12, 22 of the second hierarchy layer, a region having at least +2 pixels and −2 pixels in the X direction and the Y direction from the pixels having parallaxes. Here, if the above region is not limited to +−2 pixels, but enlarged to +−4 pixels or +−8 pixels, and then allocated to the image data 11, 21 of the uppermost layer to calculate a parallax, it is possible to reach a state amended in a range having enlarged the parallaxes of the image data 12, 22 of the second hierarchy layer.

In the reduced image data 12, 22 of the second hierarchy layer described above, a parallax is partially calculated using the parallaxes of the image data 13, 23 of the lowermost layer and the parallax of the background, and this will become a pseudo parallax with respect to the parallax obtained through parallax calculation on the whole image data 12, 22. At this time, there is a possibility that an error may be included in a portion not having a parallax difference with respect to the background image on the image data of the lowermost layer. Nevertheless, since in the above region a parallax is calculated by using the reduced image data 12, 22 of the second hierarchy layer, an error can be corrected within a range enlarged by enlarging a region performing the parallax calculation, without including an error caused by not performing the above-described parallax calculation. Regarding the first hierarchy parallax calculation method, since on the second hierarchy layer, a parallax calculation of a resolution prior to image reduction or a parallax calculation of an interpolated resolution is finally calculated for a portion where the parallax has changed, there is a feature that parallax accuracy is high. In this way, it is possible to reproduce a detailed shape from the parallax in a manner described above.

Next, description will be given to a second hierarchy parallax calculation method. In the second hierarchy parallax calculation method, a parallax of the background is not found with respect to the image data 13, 23 of the lowermost hierarchy layer. On the reduced image data 13, 23 of the lowermost hierarchy layer, parallax calculation is performed for the whole left and right reduced image data 13, 23 to find a parallax. Using this parallax calculation, a region including a portion having a parallax is determined on the image data 13, 23 of the lowermost hierarchy layer. Here, with respect to a pixel having a parallax, a region is determined which forms a range having +2 pixels and −2 pixels in the X direction and Y direction, and this region is allocated to the reduced image data 12, 22 of the second hierarchy layer.

The above region is allocated as the parallax calculation regions 16, 26 to the reduced image data of the second hierarchy layer. On the other hand, the regions on the reduced image data 13, 23 of the first lowermost layer may be expanded by +−4 pixels or +−8 pixels rather than being expanded by +−2 pixels as described above. At this time, it is possible to amend the image data 13, 23 of the lowermost hierarchy layer, i.e., an error generated by finding a parallax in a state having a low resolution, using a resolution of the second hierarchy layer in a range having an expanded portion. In this way, a region including pixels having parallaxes is determined on the reduced image data 12, 22 of the second hierarchy layer. Also, in this case, the region is set to be an area expanded by +−2 pixels, +−4 pixels, or +−8 pixels with respect to pixels having parallaxes.

Next, the above-described region is allocated to the image data as the parallax calculation regions 16, 26. The image data may be the image data 11, 21 of the uppermost hierarchy layer which is the third hierarchy layer, or the image data obtained by increasing the number of pixels through the above-described interpolation, i.e., the image data in which the distance between the pixels is set to be 0.5 times or 0.25 times the former distance. Parallax calculation is performed on the parallax calculation regions 16, 26 of the image data 11, 21 of the uppermost layer or the image data whose resolution has been increased by interpolating the image data 11, 21. The parallax calculation method is the same as in the case of the reduced image data 12, 22 of the second hierarchy layer.

The second hierarchy parallax calculation method is the basic hierarchy parallax detection method first described, and no parallax or the like of the background is to be found, so that it is possible to further reduce the calculation amount in the parallax calculation. However, since the parallax calculation regions 16, 26 in the reduced image data 12, 22 of the next hierarchy layer are not set based on the parallax of the background, and since a region containing a portion having a parallax is determined only through one parallax calculation on the reduced image data 13, 23 having a low resolution, there is a possibility that an error tends to occur as compared with the first hierarchy parallax calculation method.

Next, a description will be given to a third hierarchy parallax calculation method. The third hierarchy parallax calculation method is used basically in the following way. Namely, during parallax calculation using the first hierarchy parallax calculation method, the method does not use the reduced image data 12, 22 of the second hierarchy layer, but calculates a parallax by using hierarchy layers of two stages.

Image processing on the reduced image data 13, 23 on the lowermost layer is similar to the first hierarchy parallax calculation method, finding the parallax of a background, and obtaining parallaxes on the whole left and right image data 13, 23.

Then, the parallax and the parallax of the background are compared to each other, and a parallax that is changing with respect to the parallax of the background is found, thus determining the region of the found parallax. At this time, a region can be set which has the maximum range consisting of all pixels whose parallaxes have changed.

Next, regions calculated from the reduced image data 13, 23 of the lowermost layer are allocated, as the parallax calculation regions 16, 26, to the image data 11, 21 of the third hierarchy layer on the highest layer, or to the image data obtained by interpolating the image data 11, 21 and thus having a high resolution, in a manner described above. Further, a parallax calculation is performed on the parallax calculation regions 16, 26 of the left and right image data 11, 12.

In this case, by allocating the region found from the above-mentioned reduced image data 13, 23 of the lowermost hierarchy layer to the image data 11, 21 of the uppermost hierarchy layer having the largest number of pixels, the areas of the parallax calculation regions 16, 26 to be allocated to the image data 11, 21 of the uppermost layer will become lager than the first hierarchy parallax calculation method. That is, since the portions which have the parallax different from the background parallax are all assigned to the parallax calculation regions 16, 26, there will be an increase in the areas of the parallax calculation regions 16, 26. Namely, in the first hierarchy parallax calculation method, a portion where the background parallax and the current parallax are different from each other is allocated to the reduced image data 12, 22 of the second hierarchy layer. Then, parallax calculation is performed, and area is narrowed down to an area slightly larger than a portion having a parallax, followed by performing a parallax calculation on the image data 11, 21 of the uppermost hierarchy layer. In this way, a calculation amount will be smaller than the third hierarchy parallax calculation method. Therefore, although the third parallax calculation method has the largest calculation amount, unlike the first parallax calculation method, parallax calculation regions 16, 26 are determined in which the parallax calculation will be performed from a difference between a parallax calculated by processing at the first stage and another parallax forming a background. Then, the parallax calculation regions 16, 26 are allocated to the image data 11, 21 of the uppermost hierarchy layer having a high resolution, thereby performing the parallax calculation in the parallax calculation regions 16, 26. As a result, it is possible to increase the accuracy of a parallax, without any error caused due to a pseudo parallax in the reduced image data 12, 22 of the second hierarchy layer in the above-described first parallax calculation method.

When any one of the first to third hierarchy parallax calculation methods is used, it is possible to reduce a calculation amount of parallax calculation on the image data 11, 21 of the uppermost hierarchy layer, thus reducing a time needed in the parallax calculation. Further, when the speed of the image processing has been determined, it is possible to increase a frame rate of available moving images by performing a parallax calculation using a hierarchy parallax calculation method. In addition, even if the processing speed is increased, it is still possible to calculate a parallax having a high accuracy. Besides, when a three-dimensional shape or the like is to be found based on parallax, it is possible to definitely determine a shape in details.

EXPLANATIONS OF REFERENCE NUMERALS

1 image processing system
4 image reducing unit (image reducing unit)
5 parallax calculation unit (first parallax calculation unit, parallax calculation unit, parallax calculation region determining unit, background output unit)

The invention claimed is:

1. An image processing system comprising:
   image reducing unit for generating a plurality of reduced image data obtained by reducing a plurality of image data, the plurality of image data being obtained by photographing the same photographing range at the same photographing time using a plurality of cameras arranged at different positions for stereo photographing;
   first parallax calculation unit for calculating a parallax using the plurality of reduced image data;
   parallax calculation region determining unit for determining a parallax calculation region for calculating a parallax on image data formed prior to reducing the image data, based on the parallax calculated from the reduced image data by the first parallax calculation unit;
   parallax calculation unit that calculates a parallax in the parallax calculation region on the plurality of image data formed before image reduction, and uses the calculated parallax as the parallax of the image data formed before image reduction
   background data output unit which outputs, as background parallax data, a parallax of a portion involving no parallax change during a predetermined period, based on the reduced image data formed by reducing the image data photographed by the cameras during a predetermined period before the photographing time; and
   wherein the parallax calculation region determining unit compares the parallax calculated from the reduced image data by the first parallax calculation unit with the parallax of the background parallax data outputted from the background data output unit, and uses an unmatched portion as the parallax calculation region.

2. The image processing system according to claim 1, wherein
   the image reducing unit generates a plurality of reduced image data in which the number of pixels are stepwise different for each image data;
   the first parallax calculation unit calculates a parallax using a plurality of minimal reduced image data having the smallest number of pixels among the reduced image data;
   the parallax calculation region determining unit determines, based on the parallax to be calculated by using the reduced image data having one stage less pixels, the parallax calculation region on the reduced image data having the number of pixels one stage more than the above reduced image data or the image data formed before the image reduction;
   the parallax calculation unit calculates a parallax of the parallax calculation region of the reduced image data for which the parallax calculation region has been determined or the image data formed before the image reduction.

3. The image processing system according to claim 1, further including the camera that outputs photographed image data.

4. An image processing system comprising:
   a memory;
   image processing circuitry communicatively coupled to the memory, wherein the image processing circuitry is configured to:
   generate a plurality of reduced image data obtained by reducing a plurality of image data, the plurality of image data being obtained by photographing the same photographing range at the same photographing time using a plurality of cameras arranged at different positions for stereo photographing, the image data and the reduced image data being stored in the memory;
   calculate a parallax using the plurality of reduced image data;
   determine a parallax calculation region for calculating a parallax on image data formed prior to reducing the image data, based on the parallax calculated from the reduced image data;
   calculate a parallax in the parallax calculation region on the plurality of image data formed before image reduction, and use the calculated parallax as the parallax of the image data formed before image reduction;
   output, as background parallax data, a parallax of a portion involving no parallax change during a predetermined period, based on the reduced image data formed by reducing the image data photographed by the cameras during a predetermined period before the photographing time; and
   compare the parallax calculated from the reduced image data with the parallax of the background parallax data outputted from the background data output unit, and use an unmatched portion as the parallax calculation region.

5. The image processing system according to claim 4, wherein the image processing circuitry is further configured to:
   generate a plurality of reduced image data in which the number of pixels are stepwise different for each image data;
   calculate a parallax using a plurality of minimal reduced image data having the smallest number of pixels among the reduced image data;
   determine, based on the parallax to be calculated by using the reduced image data having one stage less pixels, the parallax calculation region on the reduced image data having the number of pixels one stage more than the above reduced image data or the image data formed before the image reduction;
   calculate a parallax of the parallax calculation region of the reduced image data for which the parallax calculation region has been determined or the image data formed before the image reduction.

6. The image processing system according to claim 4, further including the camera that outputs photographed image data.

7. An image processing method, the method comprising the steps of:
  generating a plurality of reduced image data obtained by reducing a plurality of image data, the plurality of image data being obtained by photographing the same photographing range at the same photographing time using a plurality of cameras arranged at different positions for stereo photographing;
  calculating a parallax using the plurality of reduced image data;
  determining a parallax calculation region for calculating a parallax on image data formed prior to reducing the image data, based on the parallax calculated from the reduced image data by the first parallax calculation unit;
  calculating a parallax in the parallax calculation region on the plurality of image data formed before image reduction, and using the calculated parallax as the parallax of the image data formed before image reduction
  outputting, as background parallax data, a parallax of a portion involving no parallax change during a predetermined period, based on the reduced image data formed by reducing the image data photographed by the cameras during a predetermined period before the photographing time; and
  comparing the parallax calculated from the reduced image data by the first parallax calculation unit with the parallax of the background parallax data outputted from the background data output unit, and using an unmatched portion as the parallax calculation region.

8. The method of claim 7, further comprising the steps of:
  generating a plurality of reduced image data in which the number of pixels are stepwise different for each image data;
  calculating a parallax using a plurality of minimal reduced image data having the smallest number of pixels among the reduced image data;
  determining, based on the parallax to be calculated by using the reduced image data having one stage less pixels, the parallax calculation region on the reduced image data having the number of pixels one stage more than the above reduced image data or the image data formed before the image reduction;
  calculating a parallax of the parallax calculation region of the reduced image data for which the parallax calculation region has been determined or the image data formed before the image reduction.

9. The method of claim 7, further comprising the step of outputting the photographed image data to the camera.

* * * * *